July 28, 1931. J. T. ZELLERS 1,816,037
SHEET GLASS DRAWING APPARATUS
Filed June 11, 1928 2 Sheets-Sheet 1
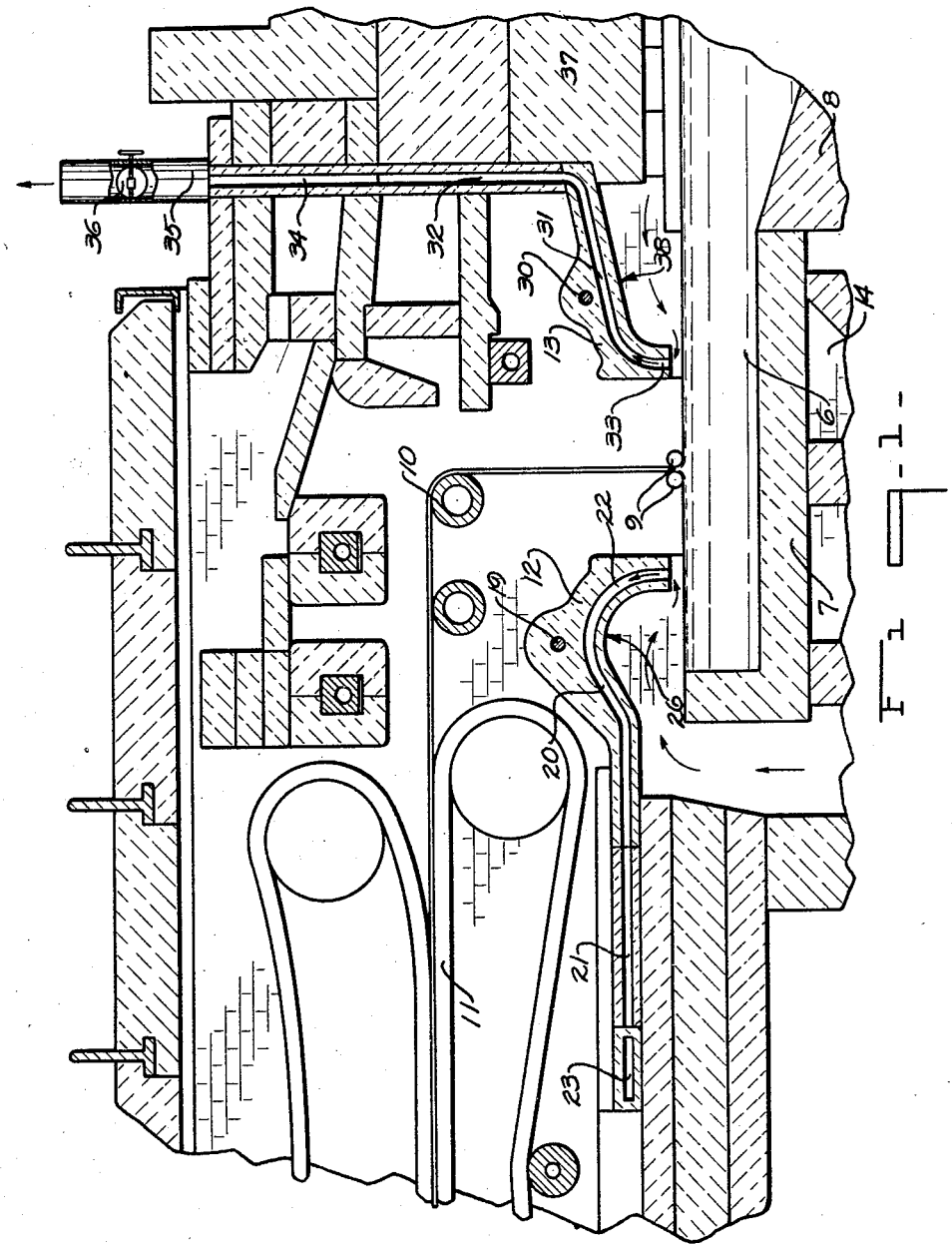
Inventor
James T. Zellers
By Frank Fraser,
Attorney

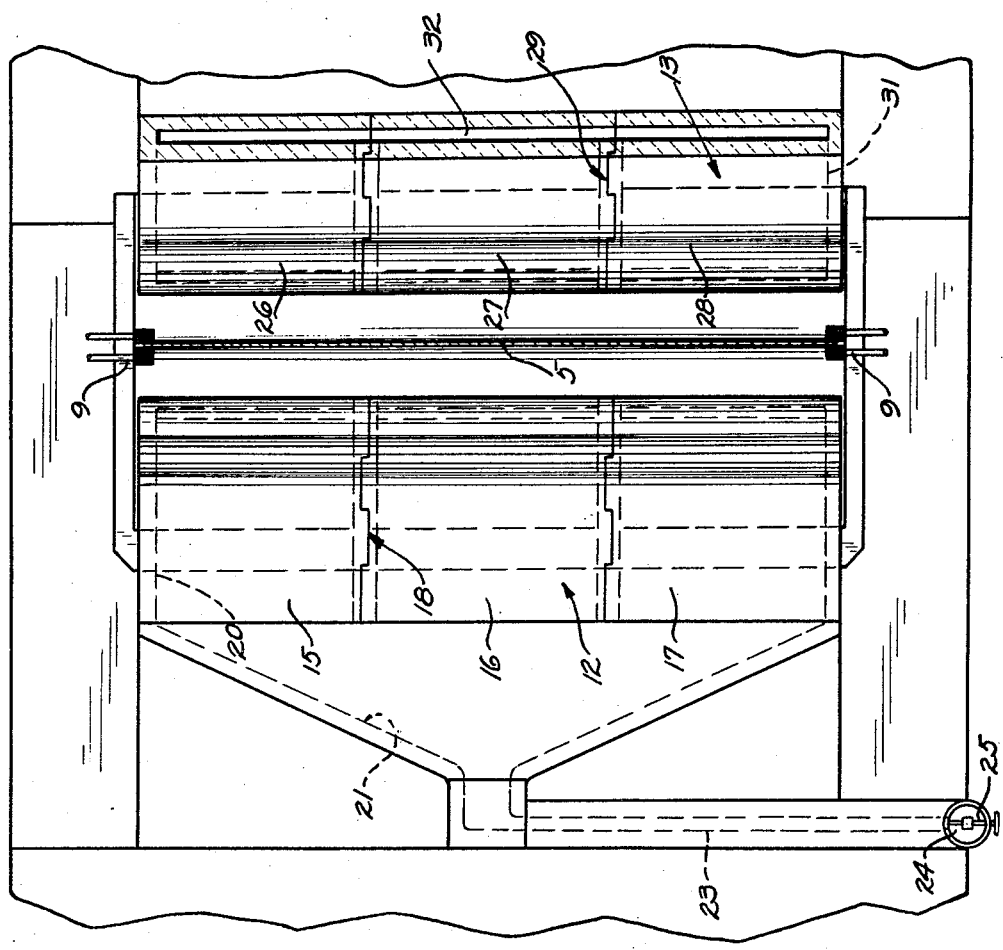

Patented July 28, 1931

1,816,037

UNITED STATES PATENT OFFICE

JAMES T. ZELLERS, OF SHREVEPORT, LOUISIANA, ASSIGNOR TO LIBBEY-OWENS-FORD GLASS COMPANY, OF TOLEDO, OHIO, A CORPORATION OF OHIO

SHEET GLASS DRAWING APPARATUS

Application filed June 11, 1928. Serial No. 284,304.

The present invention relates generally to sheet glass drawing apparatus and more particularly to the provision of an improved lip tile construction.

An important object of the invention is to provide in sheet glass apparatus, a lip tile of improved design which will serve to effectively protect the sheet being drawn from heat currents and radiated heat and also provide for a more accurate control of the heat beneath said lip tile whereby to render possible the drawing of a sheet of improved quality.

Another object of the invention is the provision of means for positively removing heat and gases from near the surface of the molten glass from which the sheet is drawn in a manner to prevent the same from coming in contact with and injuring the sheet.

Another object of the invention is the provision of improved means for regulating the volume of heat beneath the lip tiles and for withdrawing excessive heat therefrom and for controlling the amount of and rapidity with which said heat is removed.

A further object of the invention is to provide means for protecting the sheet from the fires of the furnace and pot chamber, thus allowing these fires to be run as desired without affecting the sheet, and to render possible the elimination of the present sheet coolers which are thought to be the cause of many of the waves in the sheet.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus constructed in accordance with the present invention, and Fig. 2 is a top plan view thereof.

In accordance with the Colburn system for drawing sheet glass as disclosed in the patent to I. W. Colburn 1,248,809 granted Dec. 4, 1917, a sheet of glass is drawn upwardly from a mass of molten glass contained in a relatively shallow receptacle or draw pot. In the Colburn machine there are also employed lip tiles positioned above the molten glass at opposite sides of the sheet to protect the sheet in its vertical run from heat currents and radiated heat which would otherwise strike the sheet. These lip tiles are also shaped to deflect heat and gases downwardly upon the surface of the molten glass to aid in the proper conditioning thereof. Heat absorbing shields or coolers are also usually arranged above the molten glass between the sheet and lip tiles to cooperate with said lip tiles in shielding the sheet from the heat and gases. However, it has been found that the arrangement ordinarily employed has not proven effective under all conditions to protect the sheet from the heat currents nor to effectively control the heat beneath the lip tiles to properly regulate the temperature of the molten glass in the draw pot.

The type of machine illustrated in the drawings is similar to the machine disclosed in the Colburn patent mentioned above, wherein a sheet of glass 5 is continuously drawn from a mass of molten glass 6 contained in a suitable draw pot 7 arranged in open communication with and receiving molten glass from the tank furnace 8. The sheet is drawn initially in a vertical direction, being held to width by the edge engaging means 9, the said sheet being subsequently deflected into the horizontal plane over a suitable bending member or roll 10 after which it is passed through the combined drawing and flattening mechanism 11 into a leer, not shown.

Arranged above the molten glass 6 at opposite sides of the sheet are the lip tiles 12 and 13 which are provided to protect the sheet 5 in its vertical run from heat and gases which would otherwise strike the sheet, said lip tiles being also adapted to deflect the heat and gases downwardly upon the surface of the molten glass. The draw pot 7 may be supported within a heating chamber 14 heated in any suitable manner and in addition to heating the contents of the pot through the walls thereof, heat is supplied which passes up around the front end of the pot and is deflected downwardly upon the molten glass to assist in maintaining the same in a plastic workable condition.

It has been customary in the past to arrange a heat absorbing member or water cooler adjacent each lip tile, the lower edge of the cooler being disposed relatively close to the surface of the molten glass. These coolers have been used to cooperate with the lip tiles in protecting the sheet during its vertical run as much as possible from the heat and gases present in and around the draw pot and furnace. Considerable difficulty has been had, however, in the formation of a good sheet of glass because of the action of the water coolers upon the molten glass before it is drawn into sheet form. It is generally accepted that the slightest variation in the thickness in the walls of the coolers causes defects in the sheet.

In accordance with the present invention, the lip tiles 12 and 13 are of a novel and improved construction which renders possible the elimination of the usual water coolers, said lip tiles being so constructed as to effectively protect the sheet from the heat and gases issuing from the furnace and pot chamber, thus allowing these fires to be run as desired without affecting the sheet. Moreover, the lip tile arrangement herein provided renders possible a more accurate control of the heat beneath the lip tile and provides for the drawing off of excessive heat as may be found desirable.

As shown particularly in Fig. 2, the lip tile 12 is preferably constructed of a plurality of sections 15, 16 and 17 arranged side by side with their adjacent edges interengaged with one another as indicated at 18 to provide a single tile. The lip tile 12 may be hung from a rod or shaft 19 extending through said sections. While the lip tile is herein shown as being composed of but three sections, a greater or less number of sections may of course be used as preferred. Each lip tile section is provided with an opening or flue 20, extending therethrough from front to rear and being open at its opposite ends as will be clearly apparent upon reference to Fig. 1. The flue 20 communicates at its rear end with the flue chamber 21 while its forward end is curved downwardly toward the molten glass as indicated at 22. The flue chamber 21 is common to the flues 20 of the several lip tile sections 15, 16 and 17 and leading from the said flue chamber is a transversely extending passage 23 communicating with the vertical stack 24 within which may be arranged a suitable damper 25.

In accordance with the above arrangement, it will be readily seen that the heat and gases which are conducted up around the front end of the draw pot 7, from pot chamber 14, will pass into the chamber 26 formed beneath the lip tile 12 and will be deflected downwardly by said lip tile upon the surface of the molten glass 6 to assist in maintaining the same in a plastic workable condition. Should the heat and gases start to pass beneath the front end of the lip tile in the direction of the sheet, they will immediately be sucked up through the flues 20 and will be conducted through the flue chamber 21 and passage 23 to the stack 24.

Thus, the heat and gases will be effectively prevented from passing beneath the lip tile and coming in contact with and injuriously affecting the sheet. Also, the draft of the stack 24 can be properly regulated so that the amount of and rapidity with which the heat and gases are withdrawn from the chamber 26 beneath lip tile 12 may be accurately controlled. For instance, by increasing the draft of the stack, the withdrawal of the heat and gases from the chamber 26 may be speeded up while a decrease in the draft will allow a suitable volume of heat to be built up within said chamber. Thus, the temperature of the molten glass 6 may be more effectively controlled than heretofore.

The lip tile 13, which is constructed in substantially the same manner as lip tile 12, is composed of the three sections 26, 27 and 28 arranged side by side with their adjacent side edges suitably interengaged with one another as indicated at 29, the said lip tile being supported by a shaft or rod 30 extending through said sections. Each section of the lip tile 13 is provided with an opening or flue 31 extending entirely therethrough and being open at its opposite ends as shown in Fig. 1. The flues 31 communicate at their rear ends with a common flue chamber 32 while their forward ends are curved downwardly toward the molten glass 6 as indicated at 33. Leading from the flue chamber 32 is a vertical passage 34 communicating with stack 35 within which may be arranged a suitable damper 36. Thus, the heat and gases flowing from the furnace 8 beneath the jack-arch 37 will pass into the chamber 38 formed beneath the lip tile 13 and as such heat and gases attempt to pass beneath the front end of the lip tile in the direction of the sheet, they will be immediately sucked up through the flues 33 and conducted through the flue chamber 32 and passage 34 to stack 35. The same advantages result from the use of the lip tile 13 as are derived from the use of lip tile 12.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim

1. In sheet glass drawing apparatus, a receptacle containing a mass of molten glass, means for drawing a sheet therefrom, a lip tile arranged above the molten glass at one side of said sheet, said lip tile having a flue extending substantially horizontally therethrough and open at its opposite ends, the forward end of the flue being directed downwardly toward the molten glass, a flue chamber with which the opposite end of said flue communicates, a stack, and means placing the flue chamber in communication with said stack.

2. In sheet glass drawing apparatus, a receptacle containing a mass of molten glass, means for drawing a sheet therefrom, a lip tile arranged above the molten glass at one side of said sheet, said lip tile being composed of a plurality of sections positioned side by side with their adjacent edges abutting one another, each of said sections having a flue extending substantially horizontally therethrough, the forward ends of said flues being directed downwardly toward and terminating adjacent the surface of the molten glass, a common flue chamber with which the opposite ends of said flues communicate, a stack, and means placing the flue chamber in communication with said stack.

Signed at Shreveport, in the parish of Caddo and State of Louisiana, this 29th day of May, 1928.

JAMES T. ZELLERS.